(12) United States Patent
Millet et al.

(10) Patent No.: US 7,669,665 B2
(45) Date of Patent: Mar. 2, 2010

(54) MANDREL FOR INTRODUCTION INTO A FLUID CIRCULATION DUCT, AND RELATED PRODUCTION WELL

(75) Inventors: François Millet, Antony (FR); Pierre-Arnaud Foucher, Poissy (FR)

(73) Assignee: Geoservices, Le Blanc-Mesnil (FR)

( * ) Notice: Subject to any disclaimer, the term of this patent is extended or adjusted under 35 U.S.C. 154(b) by 232 days.

(21) Appl. No.: 11/633,479

(22) Filed: Dec. 5, 2006

(65) Prior Publication Data

US 2007/0131413 A1    Jun. 14, 2007

(30) Foreign Application Priority Data

Dec. 7, 2005    (FR) .................................... 05 12435

(51) Int. Cl.
*E21B 23/01* (2006.01)
*E21B 33/129* (2006.01)

(52) U.S. Cl. .................... 166/382; 166/118; 166/206; 166/387

(58) Field of Classification Search ............... 166/179, 166/118, 206, 382, 387
See application file for complete search history.

(56) References Cited

U.S. PATENT DOCUMENTS

| | | | | | |
|---|---|---|---|---|---|
| 180,169 | A | * | 7/1876 | Tasker | ................. 279/2.13 |
| 2,901,046 | A | * | 8/1959 | Webber | ................. 166/134 |
| 3,677,341 | A | * | 7/1972 | Burns et al. | ........... 166/124 |
| 4,030,858 | A | * | 6/1977 | Coles, Jr. | .............. 417/56 |
| 4,311,196 | A | * | 1/1982 | Beall et al. | ............ 166/134 |
| 6,234,249 | B1 | * | 5/2001 | Andersen et al. | ...... 166/118 |
| 7,114,559 | B2 | * | 10/2006 | Sonnier et al. | ........ 166/206 |

* cited by examiner

*Primary Examiner*—Kenneth Thompson
(74) *Attorney, Agent, or Firm*—Wenderoth, Lind & Ponack, L.L.P.

(57) ABSTRACT

The mandrel comprises a body having a longitudinal axis together with a radially-expandable annular assembly. The annular assembly presents a peripheral surface for pressing against a borehole and a peripheral surface for pressing against the body. Around the longitudinal axis, the annular assembly comprises a plurality of radial-expansion blocks. Each block has a first bearing surface, a second bearing surface, and two side surfaces disposed respectively facing a side surface of at least one adjacent block. The block are displaceable relative to one another between a radially-contracted configuration, and a radially-expanded, engagement configuration in which each side surface of a block is in contact with the side surface of the adjacent block.

16 Claims, 8 Drawing Sheets

MANDREL FOR INTRODUCTION INTO A FLUID CIRCULATION DUCT, AND RELATED PRODUCTION WELL

BACKGROUND OF THE INVENTION

1. Field of the Invention

The present invention relates to a mandrel for inserting in a fluid-flow borehole, the mandrel being of the type comprising: a body presenting a longitudinal axis; at least one radially-expandable annular assembly attached to the body, the annular assembly presenting a peripheral surface for pressing against a borehole and a peripheral surface for pressing against the body; and means for radially expanding the annular assembly; the annular assembly comprising, around the longitudinal axis, a plurality of radial expansion blocks, each block having a first bearing face defining a portion of the peripheral surface for pressing against the borehole, a second bearing face defining a portion of the peripheral surface for pressing against the body, and two side surfaces disposed respectively facing a side surface of at least one adjacent block.

The present invention applies in particular to securing a plug or a downhole tool in a leaktight manner in an oil well. The mandrel is suitable for use with wells provided with annular positioning grooves (also known as "landing nipples") presenting a greater-diameter surface for providing sealing. The mandrel is also applicable to wells that do not include such regions.

The present invention also applies to scraping the inside walls of the well prior to securing a tool, and also to taking a molding of the inside walls.

2. Description of the Related Art

U.S. Pat. No. 6,695,051 discloses a mandrel of the above-specified type that comprises a tubular body, a radially-expandable annular sealing assembly, and deployable anchoring dogs ("slip segments").

Such a mandrel is deployed in the well using a cable working line in order to form a plug in the well, e.g. when a deposit situated at the bottom of the well is no longer being worked. It may also be deployed using coiled tubing or using a string of drilling rods.

The annular sealing assembly comprises annular gaskets that can be expanded radially by applying compression. Such gaskets are built up from rubber rings so as to provide a sealing barrier around the mandrel in the borehole.

The rubber gaskets are clamped between top and bottom rings made of metal. When a seal is established around the mandrel, the top and bottom rings are moved towards each other, with the rubber situated between the rings being compressed, thereby causing it to expand radially.

Each ring is made up of a plurality of segments disposed in a staggered configuration so as to form an anti-extrusion barrier above and below the sealing gaskets. The segments spread apart from one another during radial expansion of the gaskets.

Such a mandrel is not entirely satisfactory. The expansion ratio of rubber gaskets is relatively small. In order to make the mandrel easier to lower down a well, it is necessary to leave sufficient space between the mandrel and the borehole, such that the rubber must be highly stressed in order to press in leaktight manner against the walls of the borehole, while nevertheless having an expansion ratio that is small in order to avoid the gasket suffering creep. Furthermore, if the mandrel is kept in the well for a long period of time, rubber gaskets tend to creep between the segments, and so they are subjected to irreversible deformation. It is then not possible to remove the mandrel easily from the well. It is then necessary to drill out the mandrel or to remove the completion, which leads to the mandrel being destroyed and to significant operating costs and/or production losses.

BRIEF SUMMARY OF THE INVENTION

An object of the invention is to provide a mandrel that can be secured in a leaktight manner in a well, and that can be installed in the well and removed from the well in a manner that is simple, reliable, and inexpensive.

To this end, the invention provides a mandrel of the above-specified type, characterized in that the blocks are displaceable relative to one another between a radially-expanded, engaged configuration in which each side surface of a block is pressed against the side surface of an adjacent block, and a radially-contracted configuration contained within the radial size of the annular assembly when in its expanded configuration.

The mandrel of the invention may include one or more of the following characteristics, taken in isolation or in any technically feasible combination: each block is displaceable relative to each adjacent block by its side surfaces sliding along the side surfaces of each adjacent block between the contracted configuration and the expanded configuration, the side surfaces being shaped to cause the annular assembly to expand radially by a wedging effect;

at least a first block has a side surface converging towards its other side surface in a first direction along the longitudinal axis, at least one second block adjacent to the first block hast a side surface that diverges away from its other side surface along the longitudinal axis in the first direction;

each block is substantially trapezoidal in shape, each block being disposed oppositely with respect to the longitudinal axis relative to each adjacent block, with the height of each trapezoid being parallel to the longitudinal axis;

the body has a block-bearing surface, at least one of the blocks being mounted to slide longitudinally over the block-bearing surface between a position in which the annular assembly is in its contracted configuration and a position in which the annular assembly is in its expanded configuration;

the block-bearing surface is inclined relative to the longitudinal axis and the first bearing face of each block is substantially cylindrical about the longitudinal axis, the second bearing face being inclined relative to the longitudinal axis, the bearing faces being interconnected by the side surfaces;

the annular assembly has pressing means for pressing at least one block against the block-bearing surface;

each block comprises:
  a reinforcement comprising a top edge and/or a bottom edge defining an outer annular housing that is outwardly open at the sides; and
  an outer sealing gasket placed in the outer housing;

and in the expanded configuration, the housings of two adjacent blocks communicate with one another around at least one periphery about the longitudinal axis X-X' through side surfaces and are closed longitudinally by at least one of the top and/or bottom edges;

the reinforcement defines an inner annular housing opening inwardly and into the side surfaces, each block having an inner sealing gasket placed in the inner annular housing, and in the expanded configuration, the inner annular housings of two adjacent blocks communicate with one another about at least one periphery around the longitudinal axis through side surfaces;

it further comprises anchor members for anchoring to the borehole, the anchor members being radially deployable relative to the body and being disposed under the annular assembly;

the expansion means include a drive member releasably secured to at least one first block and secured to at least one second block, the drive member being movable longitudinally relative to the body between:

a rest position in which the first block and the second block are secured to the drive member, the annular assembly occupies its retracted configuration;

an intermediate position in which the first 5 block is free relative to the drive member and substantially stationary relative to the body, the second block being secured to the drive member; and an active position for engagement of the first and second blocks, in which the annular assembly occupies its expanded configuration; and it includes means for pressing the drive member from its active position towards its intermediate position, and releasable means for keeping the drive member in its active position.

The invention also provides a well for working a fluid and characterized in that it comprises:

a borehole; and a mandrel as defined above, disposed in the borehole.

The well of the invention may include one or more of the following characteristics:

the borehole comprises at least: a first tube; a second tube; and a sleeve interconnecting the first and second tubes; the first tube, the second tube, and the sleeve defining a fluid flow passage; and the sleeve defines an annular groove for receiving the annular assembly, opening out into the central passage, and presenting a diameter greater than the mean diameter of the central passage, the annular assembly when in its deployed position being pressed in a leaktight manner against an outer wall of the annular groove; and the sleeve presents a projection for fixing the annular assembly in a position, the projection projects inwardly into the central passage relative to the first tube and to the second tube, and a top edge of the annular assembly is jammed axially against the projection.

BRIEF DESCRIPTION OF THE DRAWINGS

The invention can be better understood on reading the following description given purely by way of example, with reference to the accompanying drawings, in which.

DETAILED DESCRIPTION OF THE INVENTION

The mandrel 10 shown in FIGS. 1 to 6 is for inserting in a production borehole 12 of an oil well disposed in the subsoil, and also referred to by the term "production tubing".

The mandrel 10 is for securing in a sealed manner in the borehole 12 to close it at a given position. In a variant, the mandrel 10 carries a downhole tool, a valve, a liner, or a tube for passing fluid.

In the example shown in FIGS. 1 to 5, the borehole 12 presents an inside wall 14 that is substantially smooth facing the mandrel 10. The borehole 12 thus does not have an annular groove for anchoring purposes and of 5 the kind designated by the term "landing nipple".

Figure 1:
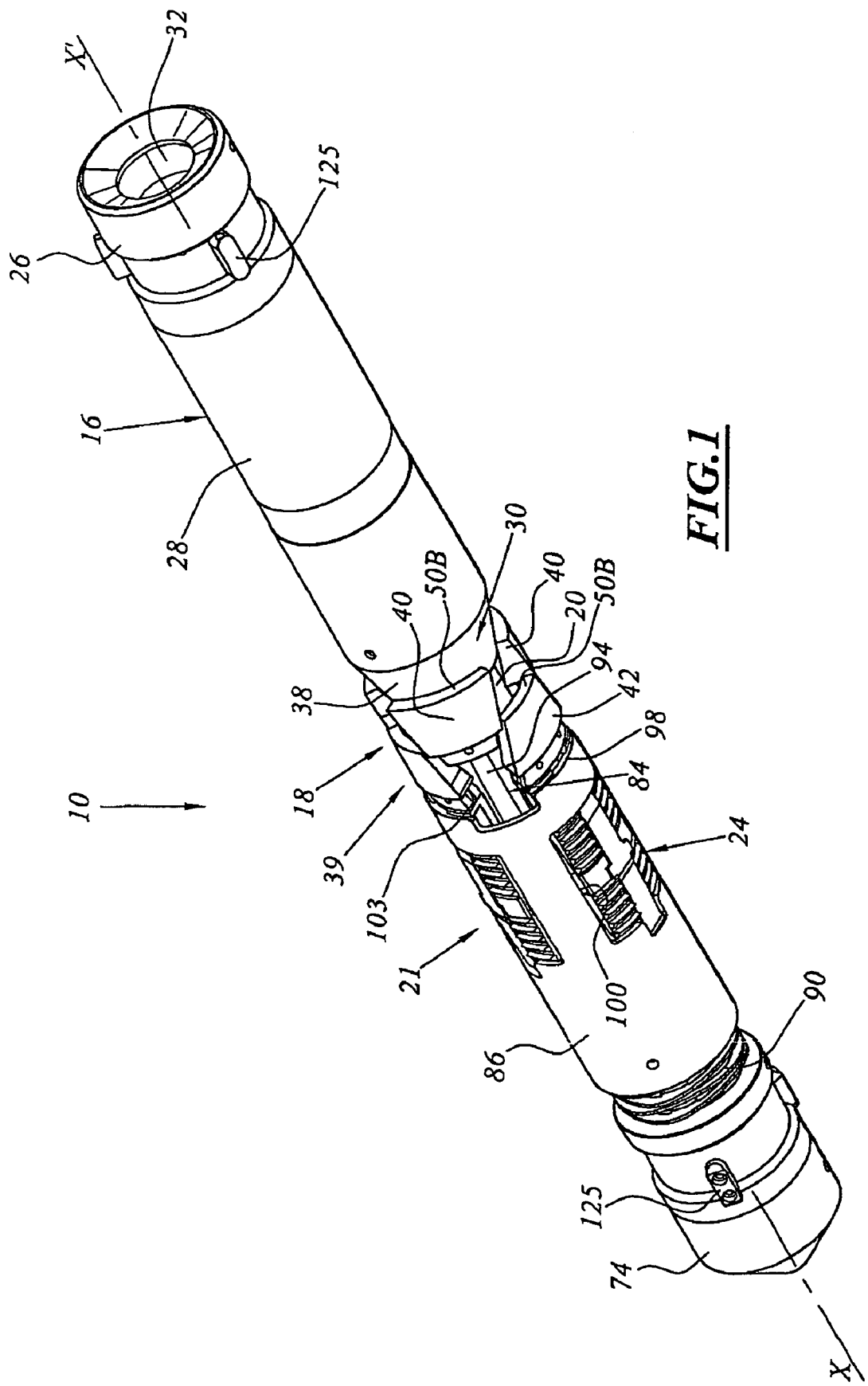
FIG. 1 is a front three-quarters perspective view of a mandrel of the invention with the annular assembly in its contracted configuration.
Figure 2:
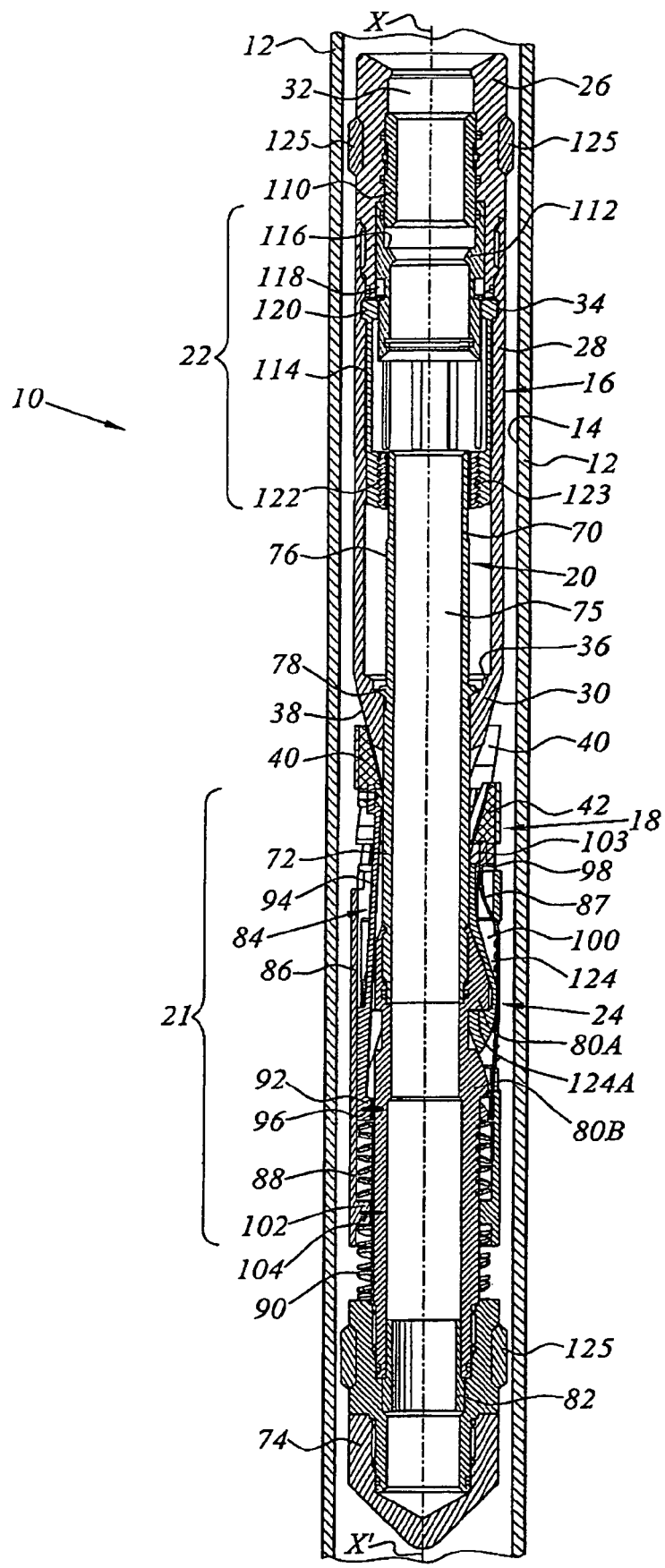
FIG. 2 is a section view on a vertical midplane of the FIG. 1 mandrel while located in a first oil well of the invention having no annular tool-receiver groove.

As shown in FIGS. 1 and 2, the mandrel 10 comprises a tubular body 16 of longitudinal axis X-X', an annular sealing assembly 18 for establishing a sealing barrier around the mandrel 10 against the inside wall 14, 10 and a tube 20 for driving the annular sealing assembly, connected to the annular sealing assembly 18 via releasable connection means 21. The mandrel 10 also includes releasable means 22 for locking the drive tube 20, and radially-deployable anchor dogs 24.

Going from top to bottom in FIG. 2, the tubular body 16 comprises: a connection cap 26 for connection to a control or "work line" cable via a laying and removal tool (not shown), an intermediate hollow tubular portion 28, and a bottom conical portion 30 converging towards 20 the bottom of the well, for supporting the annular sealing assembly 18.

Over its entire length, the body 16 defines a central passage 32 of axis X-X' opening out to the top and bottom ends of the body 16.

The connection cap 26 includes a groove for receiving a connection head for connection to a cable (not shown) for deploying the mandrel 10 in the well and for removing it from the well. The cable may be as described in French patent application FR-A-2 848 363, for example.

The intermediate tubular portion 28 is screwfastened under the cap 26. In the vicinity of the cap 26 it defines an annular groove 34 for receiving the releasable locking means 22. This annular groove 34 35 opens into the central passage 32.

In the passage 32, in the vicinity of the conical portion 30, the tubular portion 28 defines a bottom abutment 36 of the locking means 22 and of the drive tube 20, as described in detail below.

On its outside, the conical portion 30 presents a conical bearing surface 38 of the annular assembly 18. This surface 38 converges towards the bottom of the well.

Figure 3:
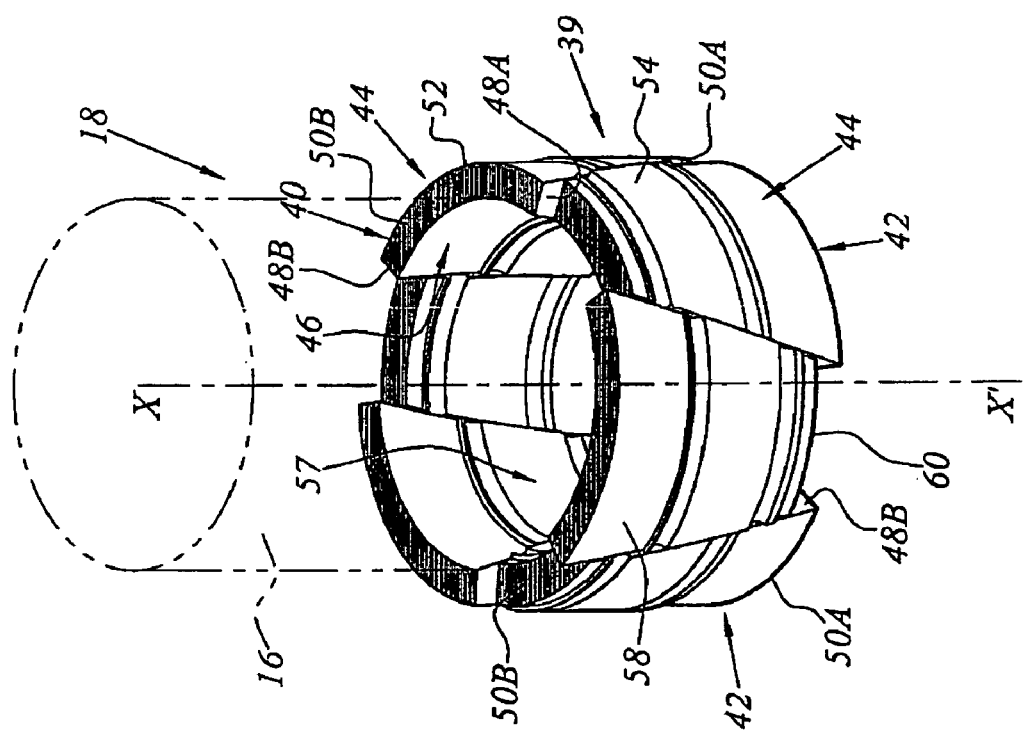
FIG. 3 is a front three-quarters perspective view of the annular sealing assembly of the FIG. 1 mandrel in its radially-expanded configuration.

As shown in FIG. 3, the annular sealing assembly 18 comprises, going along a peripheral outer surface 39 around the longitudinal axis X-X', an alternation of top blocks 40 and bottom blocks 42 disposed in opposite directions along the longitudinal axis X-X'.

In the example shown in FIG. 3, the annular assembly 18 has three top blocks 40 and three bottom blocks 42.

Each block 40, 42 defines an outside face 44 for 15 bearing against the borehole, an inside face 46 for bearing against the body 16, and two expansion side surfaces 48A, 48B interconnecting the faces 44 and 46. Each block 40, 42 also presents a bottom surface 50A and a top surface 50B extending substantially perpendicularly to the axis X-X' in FIG. 3.

Each outside face 44 is substantially cylindrical in shape about the axis X-X' and forms a portion of the surface 39. Each inside face 46 presents a conical shape that converges upwards along the axis X-X'. The bottom faces 46 are substantially complementary in shape to the bearing surface 38 of the body.

The side surfaces 48A, 48B are substantially helical in shape about the axis X-X'.

In the expanded configuration shown in FIG. 3, each side surface 48A, 48B of a top block 40 is placed to bear against a side surface 48B, 48A of an adjacent bottom block 42.

The bottom and top blocks 40, 42 are generally trapezoidal in shape in side view, with the height of each trapezoid extending parallel to the longitudinal axis X-X'.

Thus, the side surfaces 48A, 48B of each top block 40 splay apart from each other going upwards along the axis X-X', while the side surfaces 48A, 48B of each bottom block 42 converge towards each other in the same direction.

Figure 4A:
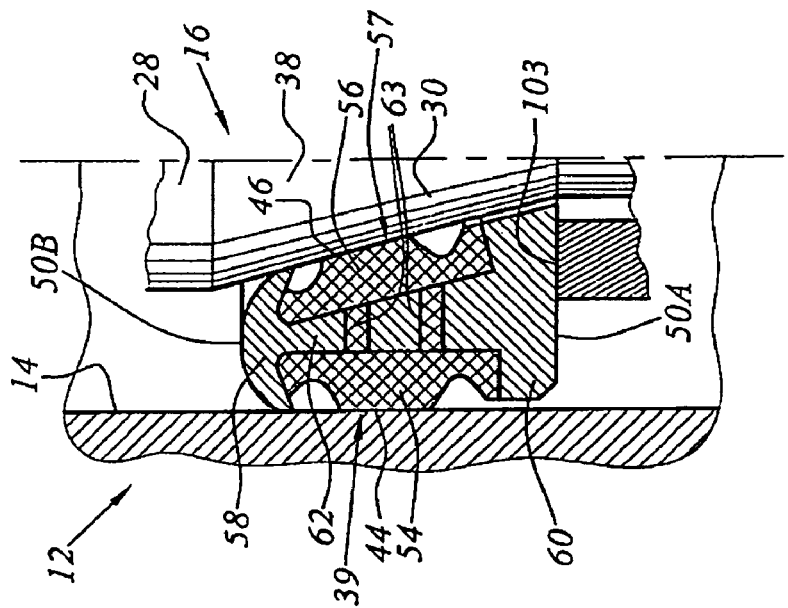
FIG. 4A is a fragmentary view on a larger scale showing a detail of FIG. 2 in the expanded configuration.

In the example shown in FIGS. 3 and 4A, each block 40, 42 comprises central metal reinforcement 52, an outer gasket 54 for sealing against the borehole 12, and an inner gasket 56 for sealing against the body 16, the gaskets being mounted on opposite sides of the reinforcement 52.

The reinforcement 52 presents a cross-section that is substantially I-shaped. It thus presents a top edge 58 and a bottom edge 60 that are interconnected by a central core 62 of thickness smaller than the thicknesses of the top edge 58 and the bottom edge 60.

The edges 58 and 60 co-operate with the central core 62 to define an outer annular housing and an inner annular housing respectively receiving the gaskets 54 and 56. These housings open out sideways into the side surfaces 48A, 48B of the block 40, 42 and they are closed longitudinally by the edges 58 and 60. Thus, any creep of the gaskets 54, 56 is contained longitudinally within the outer and inner housings.

As shown in FIG. 4A, the top edge 58 comprises, on either side of the central core 62, lips that are axially and/or radially deformable upwards during contact with the inside wall 14 of the borehole 12 and with the conical surface 38 of the body 16 under the effect of the gaskets 54, 56 deforming, as described below.

Passages 63 are formed radially through the central core 62 and they interconnect the outer and inner annular housings.

By way of example, the reinforcement 52 is made of metal. The gaskets 54, 56 are of an elastomer or of a plastic material, for example. The inner gasket 56 is placed to press against the conical surface 38, while the outer gasket 54 is for pressing against the inside wall 14 of the borehole 12. The gaskets 54, 56 are made by being molded over the reinforcement 52, for example.

In a variant, the reinforcement 52 could be made of a plastic material. In another variant, the gaskets 54 could be made of a metal that is softer than the metal of the reinforcement 52, e.g. lead.

Figure 5:
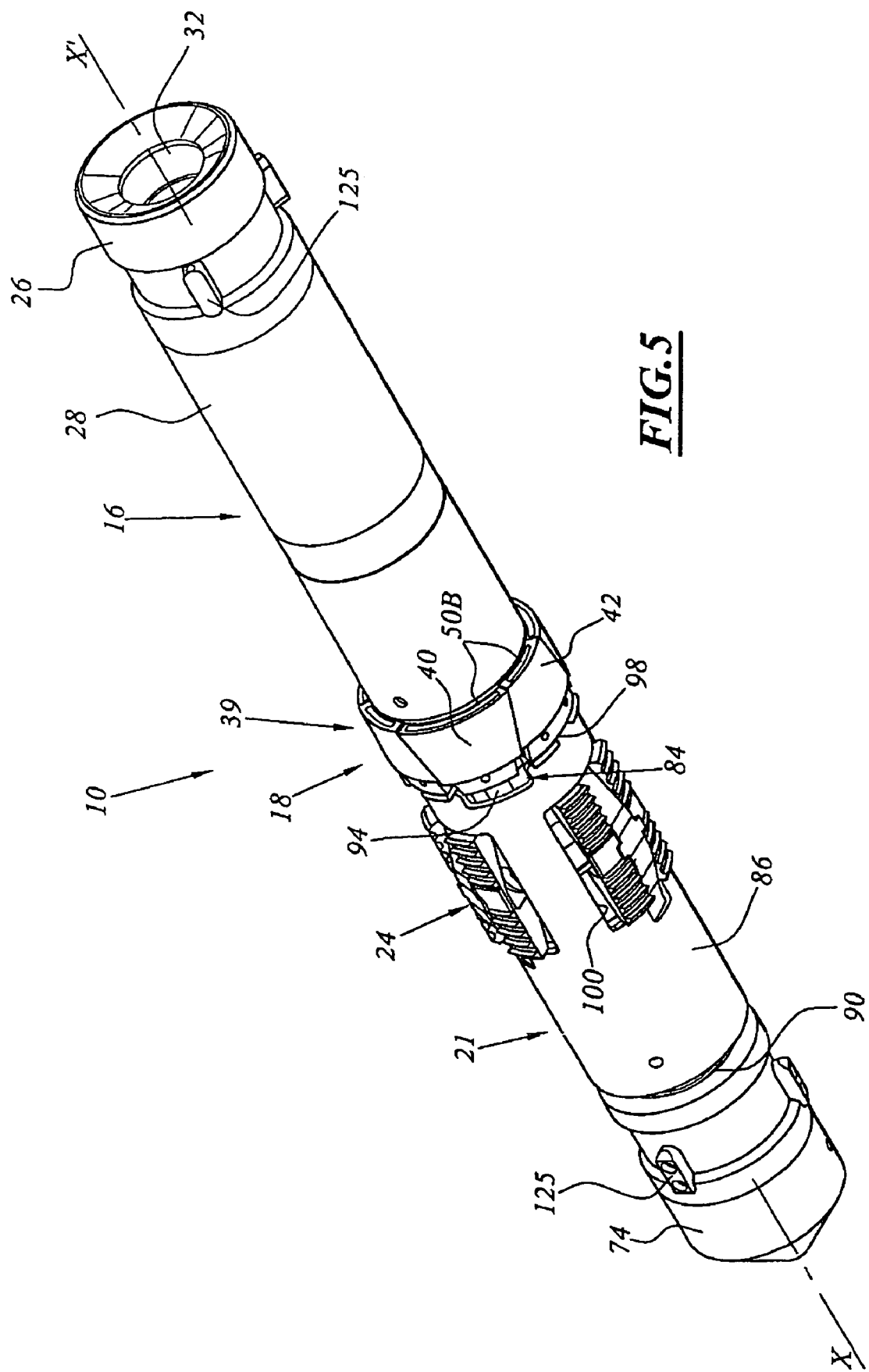
FIG. 5 is a view analogous to FIG. 1 in the expanded configuration.

As shown in FIGS. 1 and 5, the bottom blocks 42 are displaceable longitudinally and radially relative to the top blocks 40 by sliding along the lateral surfaces 48A, 48B between a radially-contracted disengaged configuration of the annular assembly 18 and a radially expanded, engaged configuration of said assembly 18.

In the contracted configuration shown in FIG. 1, the distance between the top surface SOB of a top block 40 and the top surface 50B of an adjacent bottom block 42 is at a maximum, the blocks 40, 42 then being in a spaced-apart position.

Thus, the distance between the facing side surfaces 48A, 48B of two facing top blocks 40 as measured around a circumference about the axis X-X' is at a minimum, as is the distance between the facing side surfaces 48A, 48B of two facing bottom blocks 42.

The annular assembly 18 is thus partially disengaged and presents a minimum radial size. Thus, the mandrel 10 can be moved in a certain and easy manner along the borehole 12, with limited risk of jamming in the borehole 12, and facilitating its descent against an opposing flow of the liquid present in the borehole 12.

In the expanded configuration shown in FIG. 5, the distance between the top edge SOB of a bottom block 42 and the top edge 50B of an adjacent top block 40 is at a minimum with the blocks 40, 42 being close together in position. The distance between the facing side surfaces 48A, 48B of two adjacent top blocks 40 is then at a maximum, as is the distance between the facing side surfaces 48A, 48B of two adjacent bottom blocks 42.

As explained below, the engagement of the bottom blocks 42 between the top blocks 40 by the side surfaces 48A, 48B of the blocks 42 sliding over the side surfaces of the adjacent blocks causes the annular assembly 18 to expand radially by a wedging effect on the surfaces 48A, 48B. Thus, in its expanded configuration, the annular assembly 18 presents an outer peripheral surface 38 that is substantially cylindrical and of maximum radial size.

In the expanded configuration, the outer and inner annular housings in each block 40, 42 open out respectively into the outer and inner housings of the adjacent blocks 42, 40 such that the inner and outer gaskets 54, 56 extend continuously over at least one periphery around the axis X-X'. The outer gaskets 54 thus define the peripheral annular surface 39 for bearing against the borehole. The inner gaskets 56 define an inner peripheral surface 57 for bearing against the body 16, which surface is continuous over at least one periphery around the axis X-X'.

In addition, each side end of a top edge 58 of a block 40, 42 is pressed at least in part against the side end of a top edge 58 of an adjacent block 42, 40. Likewise, each side end of a bottom edge 60 of a block 40, 42 is pressed against the side end of a bottom edge 60 of an adjacent block 42, 40. The inner and outer annular housings are thus closed longitudinally over the entire periphery of the annular assembly 18.

The ratio of the radial size of the annular assembly 18 in the expanded configuration to the radial size of the annular assembly 18 in the contracted configuration thus lies in the range 1.05 to 1.50, and it is preferably greater than 1.15. The annular assembly 18 in its contracted configuration is thus contained within the radial size of said assembly when in its deployed configuration, and advantageously within the radial size of the body 16. The drive tube 20 is mounted to slide in the tubular body 16. It has a top portion 70 disposed in the passage 32, a bottom portion 72 projecting longitudinally downwards out from the body 16, and a plug 74 screwed onto the bottom end of the bottom portion 72. The tube 20 defines a hollow central bore 75 of axis X-X' that opens out at its top end into the central passage 32.

On the outside, the top portion 70 presents a smooth top region and a bottom region that is provided with a set of ratchet teeth 76 for co-operating with the locking means 22, as described below. The top portion 70 is defined at its bottom by an annular rib 78 suitable for co-operating with the bottom abutment 36 to prevent the tube 20 being moved downwards beyond a bottom position.

In a middle region situated facing the anchor dogs 24, the bottom portion 72 has two groups of shoes 80A, 80B for deploying the dogs 24, which project radially out from the portion 72. These shoes 80A, 80B present a cross-section that converges radially going upwards, e.g. a section that is conical or plane.

The plug 74 extends and closes in a sealed manner the central bore 75 at its bottom end. The plug has a frangible traction ring 82 disposed inside the bore 75 for connection to a laying tool.

As explained below, the drive tube 20 is movable longitudinally relative to the body 16 between a rest position in which the blocks 40, 42 are disengaged, an intermediate position for jamming the top blocks 40 on the body 16, an active position for engaging the bottom blocks 42 in the top blocks 40, and a position for expanding the anchor dogs 24.

The releasable connection means 21 comprise a guide clamp 84 for guiding the top blocks 40, a cage 86 for pushing the bottom blocks 42 and for guiding the dogs 24 radially, spring blades 87 for returning the bottom blocks 42 and the dogs 24 towards the axis X-X', a top spring 88, and a bottom spring 90 for returning the tube 20 to its rest position.

The guide clamp 84 comprises a bottom ring 92 releasably mounted on the drive tube 20 and a plurality of spring blades 94 for connection to the top block 40.

The ring 92 extends around the bottom portion 72 of the tube 20 beneath the deployment shoes 80B. It is connected to the tube 20 by a first frangible pin 96. The blades 94 are distributed around the ring 92.

Each blade 94 extends longitudinally between the ring 92 and an associated top block 40. The number of blades 94 is thus equal to the number of top blocks 40.

The blades 94 generate a resilient force acting radially towards the axis X-X' for pressing the top 15 blocks 40 against the conical bearing surface 38.

The cage 86 extends around the drive tube 20. It co-operates with the tube 20 to define an annular space in which there are received the ring 92, the bottom portions of the blades 94, the anchor dogs 24, and the return blades 87 for the bottom blocks and for the anchor dogs 24.

Going from top to bottom in FIG. 2, the cage 86 presents a top surface 98 for pushing the bottom blocks 42, longitudinal notches 100 for passing the anchor dogs 24, and in the vicinity of its bottom end, a bottom annular rib 102 placed to bear against the bottom portion of the tube 20.

Each return blade 87 has a bottom end prevented from moving radially by the cage 86 and free to move axially along the axis X-X' between two abutments on the dogs 24. Each blade 87 has a top end secured to a bottom block 42.

The top end of each blade 87 is secured to the bottom surface 50A of a bottom block 42. The return blades 87 thus continuously press the bottom block 42 radially towards the axis X-X' by pressing against the cage 86. Each block 42 is thus displaceable radially relative to the top surface 98 by sliding over a top surface of a tab 103 secured to an anchor dog 24 and interposed between the top surface 98 and the block 42.

The notches 100 extend next to the anchor dogs 24 to allow them to be deployed radially outwards through the cage 86.

The annular rib 102 is complementary in shape to the bottom portion 72 of the tube 20. It is connected to the tube 20 by a second frangible pin 104.

The top spring 88 is interposed in the annular space 10 bearing against the ring 92 and the rib 102. When the spring 88 is compressed, it presses the cage 86 away from the guide clamp 84.

The bottom spring 90 is interposed between the annular rib 102 and the plug 74. It presses the tube 20 towards its rest position.

Going downwards in FIG. 2, the locking means 22 comprise a pressure-equalizing jacket 110, a ring 112 for releasing the tube 20, and a clamp 114 for locking the tube 20.

The pressure-equalizing jacket 110 is formed by a cylindrical sleeve placed to seal the connection cap 26. The jacket 110 is mounted to slide in the central passage 32 between a sealing, top position and a bottom position where it presses against the ring 112.

The release ring 112 is likewise constituted by a substantially cylindrical sleeve. In its top portion it receives a bottom portion of the pressure-equalizing jacket 110.

The release ring 112 presents a bottom annular abutment 116 for co-operating with the jacket 110 while it is being displaced towards its bottom position.

The ring 112 can be displaced between a top position for holding the clamp 114 and a bottom position for releasing said clamp 114 by resilient return. On the outside it defines an annular housing 118.

The clamp 114 is likewise tubular in shape. It includes a top bead 120 for blocking its longitudinal position, and an inside surface with teeth 122 for ratchet engagement with the tube 20. An intermediate split ring 123 is engaged externally in the inside toothed surface 122, between said surface 122 and the tube 20. The intermediate ring 123 presents an inside surface for ratchet engagement with the tube 20.

The locking clamp 114 is thus movable between a top position for blocking the tube 20, in which the bead 120 is received in the annular groove 34 of the body 16, and a bottom position, in which the bead 120 is received in the housing 118 of the release ring, and in which the bottom end of the clamp 114 bottom surface 122 is pressed against the abutment 36.

The anchor dogs 24 are disposed axially under the bottom blocks 42. They are distributed around the axis X-X'.

Each dog 24 comprises a support 124 that is radially deployable by the shoes 80A, 80B between a position retracted inside the cage 86 under drive from the blades 87, and a radially-outwardly deployed position projecting through the notches 100 while continuing to be held captive in the cage 86 by the blades 87.

The return blades 87 are pressed against an outside surface of the support 124 and they deploy radially together with the support 124. The sliding tabs 103 are connected to the support 124. The top surfaces of the tabs 103 extend radially outwards.

The supports 124 present top abutment surfaces 124A facing upwards and situated beneath respective deployment shoes 80A.

Centering shoes 125 project radially outwards from the cap 26 and the plug 74 to align the mandrel 10 axially in the borehole and to protect it while it is being lowered or raised along the borehole 12.

The operation of the mandrel 10 of the invention is described below.

Initially, as shown in FIGS. 1 and 2, the mandrel 10 is placed in a configuration for being lowered down the borehole 12.

For this purpose, the tube 20 is placed in its rest position in which the distance between the tube and the plug 74 of the body 16 is at a maximum. In this position, the annular rib 78 presses against the abutment 36. Furthermore, the guide clamp 84 is kept secured to the bottom portion 72 of the tube 20 by the first pin 96. The top blocks 40 are thus disposed to press against the conical surface 38, facing a bottom portion thereof. They are kept pressed against the surface 38 by the blades 94.

The cage 86 is secured to the bottom portion 72 of the tube 20 by the second pin 104, such that the bottom blocks 42 are located in part away from the top blocks 40 and beneath these blocks 40. The annular sealing assembly 18 thus occupies its partially-disengaged configuration in which it is radially contracted.

The anchor dogs 24 are retracted into the cage 86. The bottom spring 90 is kept in a prestressed condition to press the tube 20 towards its rest position.

The mandrel 10 thus presents a minimum radial size making it easy to lower down the borehole 12 without any risk of damaging the sealing assembly 18. The minimum gap between the mandrel 10 and the inside wall 14 of the borehole 12 is wide enough to limit problems associated with the mandrel 10 being moved against the flow direction of the liquid present in the borehole 12. The centering shoes 125 enable the mandrel 10 to be guided in the borehole and kept in alignment on the longitudinal axis of the borehole, and they serve to protect the mandrel 10 while it is being raised or lowered.

In this configuration for lowering, the jacket 110 is placed in its top position, spaced apart from the bottom annular abutment 116 of the release spring 112. The release spring 112 is placed in such a manner that the annular housing 118 extends over the top bead 120 of the locking clamp 114, which is itself fixed in position in the annular groove 34.

A laying tool is also inserted in the central passage 32 and in the central bore 75 before lowering into the well in order to co-operate with the traction ring 82 and the connection cap 26. 10 This tool then presents a stationary portion (not shown) bearing against and/or hooked to the cap 26, and a moving portion (not shown) engaged in the frangible traction ring 82.

The mandrel 10 is then lowered down the borehole 12 by connecting the laying tool to a cable.

When the mandrel 10 reaches a desired position in the well, the laying tool displaces the frangible traction ring 82 upwards, while keeping the body 16 longitudinally stationary relative to the borehole 12. The tube 20 then passes from its rest position to its intermediate position.

During this displacement, the guide clamp 84 is kept secured to the tube 20 such that the top blocks 40 slide longitudinally upwards over the conical surface 38, thus causing them to expand radially. The blades 94 keep the top blocks 40 pressed against said surface 38 during the displacement.

The cage 86 is also secured to the tube 20, such that the bottom blocks 42 are displaced simultaneously upwards by the mechanical stack between the top surface 98, the tabs 103, and the bottom blocks 42. The distance between the top surface 50B of a top block 40 and the top surface 50B of an adjacent bottom block 42 is kept constant during this displacement.

Similarly, the top portion 70 of the tube 20 also rises in the locking clamp 114. Nevertheless, the outer teeth 76 remain situated beneath the toothed inside surface 122, thus enabling the tube 20 to return to its rest position, should it be necessary to modify the position of the mandrel 10.

Thereafter, the first pin 96 engaged between the ring of the clamp 92 and the tube 20 is broken in order to release the top blocks 40 relative to the tube 20. The top blocks 40 are then substantially stationary longitudinally relative to the top surface 38.

The tube 20 then slides longitudinally from its intermediate position to its active position. During this displacement, the cage 86 moves upwards together with the tube 20, and pushes up the tabs 103 and the bottom blocks 42. The bottom blocks 42 then engage between the top blocks 40 by sliding over the conical surface 38. The side surfaces 48A, 48B of each block 42 slide on the side surfaces 48A, 48B of the adjacent blocks 40.

This sliding displacement causes the blocks 42 and 40 to expand radially by a wedging effect.

Furthermore, the teeth 76 on the tube 20 engage in the intermediate ring 123 such that the clamp 114 and the tube 20 are mutually engaged. It is then not possible to return the tube 20 towards its rest position.

In the active position shown in FIG. 5, the distance between the top edge 50B of each top block 40 from the top edge 50B of the adjacent bottom block 42 is at a minimum. The annular assembly 18 then occupies its radially-expanded, engaged position.

As specified above, the outer peripheral surface 39 of the assembly 18, formed by the outer peripheral faces 44 of the blocks 40, 42 is continuous, at least over one periphery around the axis X-X'. This outer peripheral surface 39 is pressed against the inside wall 14 of the borehole 12 to provide sealing around the mandrel 10. The continuity of the surface 39 is provided by the outer gaskets 54 being compressed along three axes within the outer annular housings.

In addition, the inner peripheral surface 57 of the assembly 18 formed by the inner peripheral faces 46 of the blocks 40, 42 is continuous over at least one periphery around the axis X-X'. This inner peripheral surface 57 is pressed against the bearing surface 38 of the body 16 to provide sealing between the assembly 18 and the body 16.

Continuity of the surface 57 is provided by the inner gaskets 56 being compressed along three axes within the inner annular housings.

The annular housings are defined by the edges 58 which prevent the gaskets 54 and 56 being extruded under the effect of the compression.

During the displacement of the tube 20 from its intermediate position to its active position, the distance between the annular rib 102 and the ring 92 decreases considerably, such that the top spring 88 is highly compressed.

Thereafter, the second pin 104 is broken and the tube 20 is raised further in order to deploy the anchor dogs 24 and cause them to be held by the wall 14, but without axial displacement relative to the annular assembly 18.

During the displacement of the tube 20 from its active position to its anchoring position, the shoes 80A are displaced longitudinally upwards relative to the supports 124, thereby causing the supports 124 to expand radially by the wedging effect and causing them to be anchored against the inside wall 14 of the borehole 12.

The distance between the annular rib 102 and the plug 74 is then at a minimum, such that the bottom spring 90 is likewise highly compressed.

In the anchoring position of the tube, the frangible ring 82 is broken, thereby releasing the laying tool.

The mandrel 10 is then secured firmly and in a leaktight manner in the borehole 12. It should be observed that the bottom blocks 42 can still move axially upwards under the effect of pressure.

Figure 4:
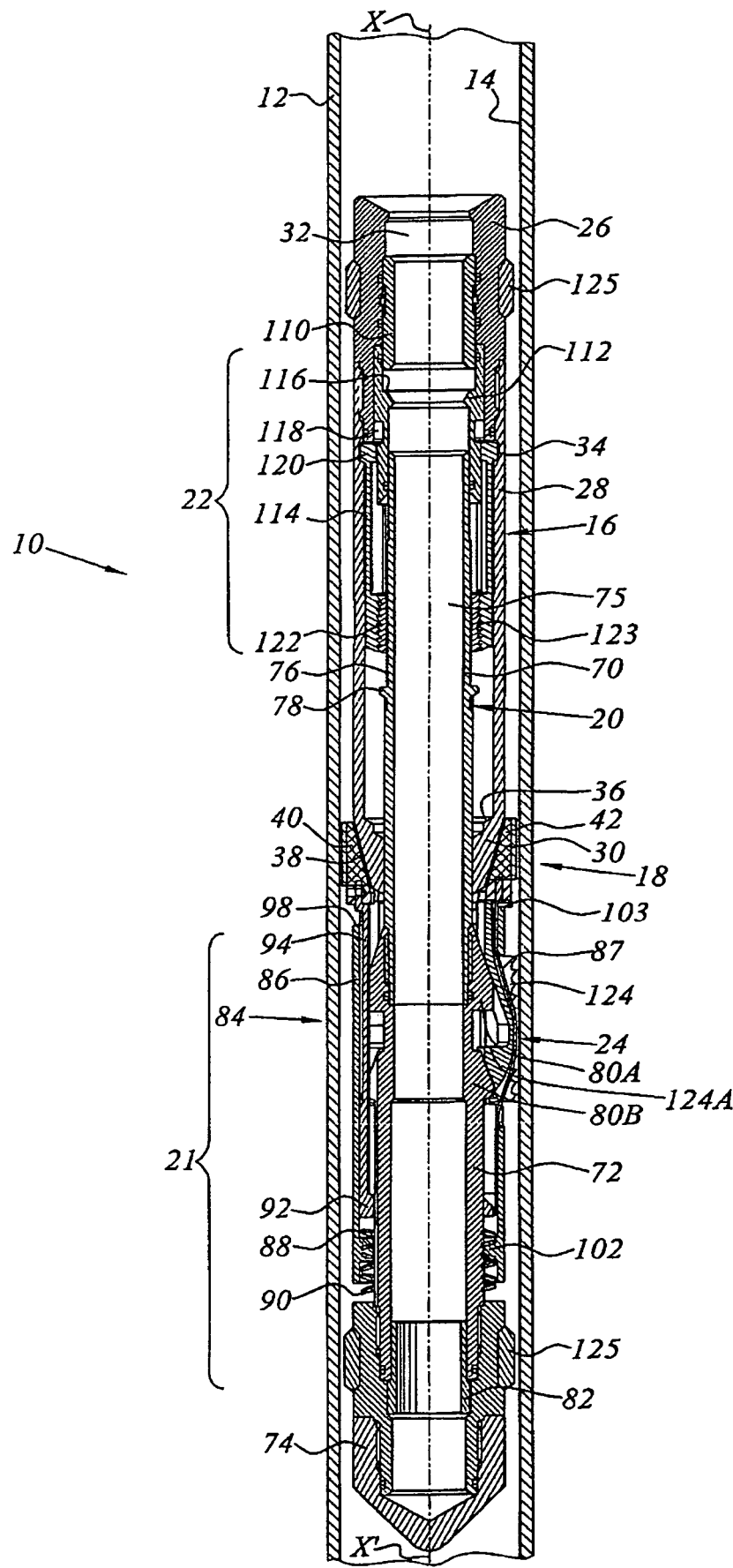
FIG. 4 is a view analogous to FIG. 2 with the annular assembly in an expanded configuration.

In the example shown in FIGS. 2 and 4, it should be observed that the inside surface of the borehole 12 is substantially smooth over the entire length of the mandrel 10. The mandrel 10 thus serves to be anchored in a leaktight and secure manner at any point along the borehole 12, without it being necessary for annular housings to be provided in the wall 14 for receiving it.

When the mandrel 10 is to be separated from the borehole 12, a tool (not shown) is inserted into the passage 32 in order to move the pressure-equalizing jacket 110 downwards so as to equalize pressures between the bottom portion of the borehole 12 situated under the sealing assembly 18 and the top portion of the borehole 12 situated above the sealing assembly 18.

Thereafter, the jacket 110 is pushed downwards onto the inner annular abutment 116 to cause the ring 112 to be displaced downwards relative to the body 16. When the ring 112 is in its bottom position, the beads 120 penetrate into the housings 118 and are extracted from the annular grooves 34.

The assembly formed by the release spring 112 and the locking clamp 114, the split ring 123 and the tube 20 is then free to slide downwards in the passage 32 until the bottom portion 122 of the locking clamp 114 comes into abutment against the abutment 36 of the body 16.

During this displacement, and under the effect of the bottom spring 90 and of the recovery tool being hammered downwards, the tube 20 also moves downwards from its anchoring position towards its active position, and then towards its intermediate position.

The displacement of the tube 20 causes the dogs 24 to be withdrawn into the cage 86 under the action of the return blades 87. In addition, the shoes 80B come into abutment against the abutment surface 124A, thereby causing the bottom blocks 42 to be displaced downwards along the surface 38 by means of the return blades 87. During this displacement, the bottom blocks 42 move longitudinally away from the top blocks 40.

Thereafter, under the action of the recovery tool connected to the cap 26 being hammered upwards, the top blocks 40 are moved relative to the conical surface 38. Under the action of the spring 88, the cage 86 moves downwards away from the guide clamp 84. The annular assembly 18 has then gone from its radially-expanded, engaged configuration to its radially-contracted, disengaged configuration. The mandrel 10 can then be raised easily and simply to the surface along the borehole 12, enabling the top blocks 40 to be retracted under the action of the blades 94.

Figure 6:
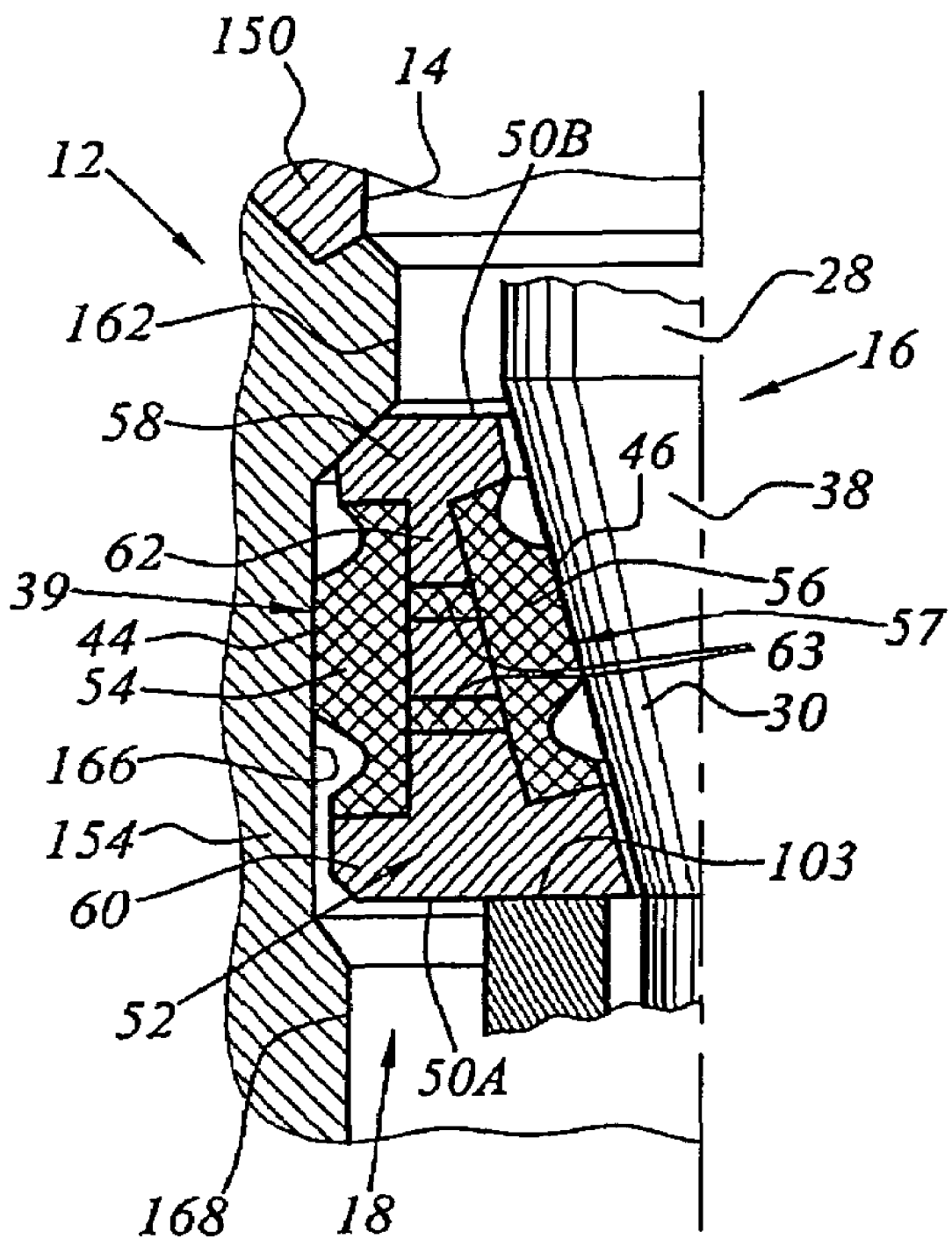
FIG. 6 is a section view of a detail of the FIG. 4 mandrel in a second oil well of the invention including an annular groove for receiving the annular assembly.
Figure 7:
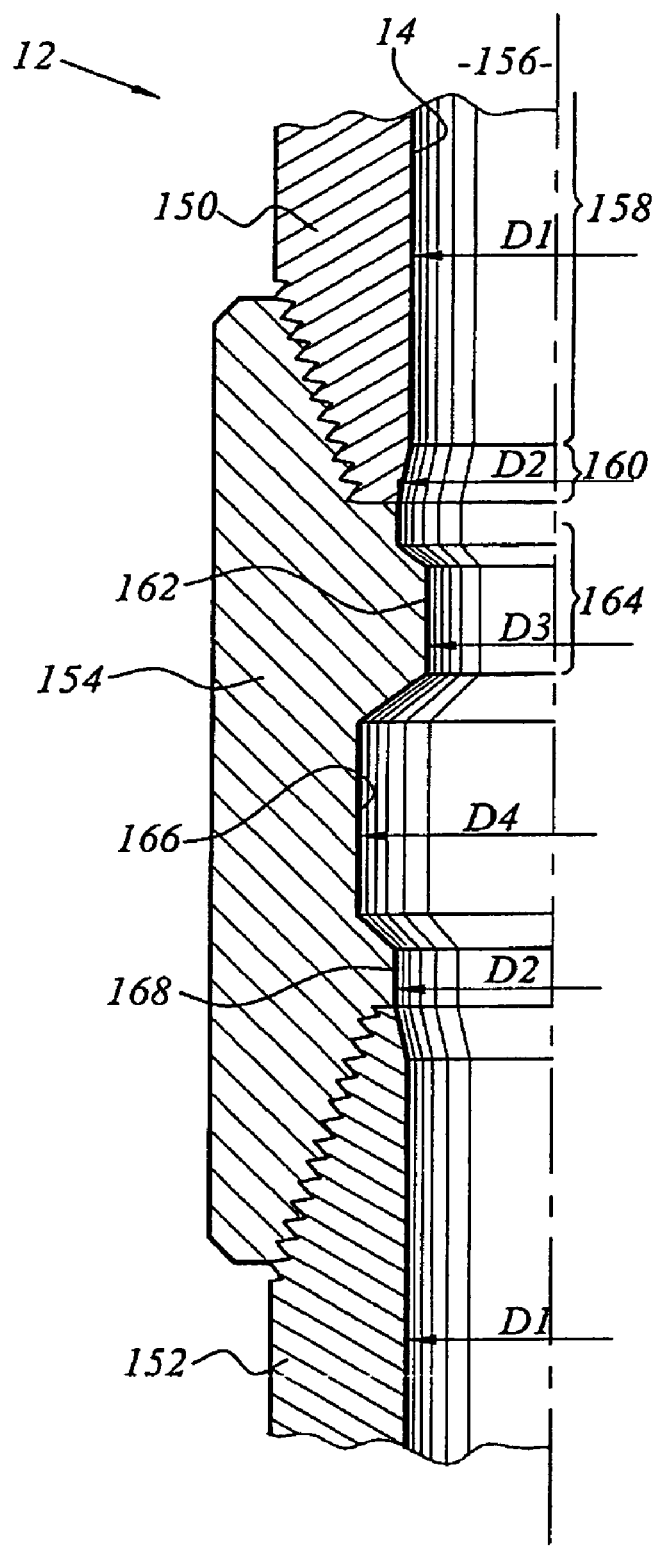
FIG. 7 is a section view on a vertical midplane of the second oil well of the invention in the vicinity of the annular groove of FIG. 6.

In the well shown in FIGS. 6 and 7, the borehole 12 comprises a top tube 150 and a bottom tube 152 interconnected by an intermediate sleeve 154 that is screwed onto the threaded outside surfaces of the respective tubes 150 and 152.

As shown in FIG. 7, the top tube 150, the bottom tube 152, and the sleeve 154 define a central passage 156 for fluid flow.

In the passage 156, the top tube 150 defines a first region 158 having a nominal diameter 01, and a second region 160 adjacent to the sleeve and presenting an inside surface that flares a little going downwards until it reaches a diameter 02 that is greater than 01.

The sleeve 154 has a top annular abutment portion 162 flush with the top tube 150 or projecting slightly into the central passage 156 relative to the tubes 150 and 151. The annular portion 162 defines a region 164 of the passage 156 having a diameter D3 that is equal to or less than the diameter 01 of the first region 158 and than the diameter D2 of the second region 160. By way of example, the ratio of the diameter D3 to the diameter 01 lies in the range 0.8 to 1.

Furthermore, beneath the portion 162, the sleeve 154 defines an annular housing 166 for receiving the annular sealing assembly 18 of a mandrel 10 of the invention. The diameter 04 of the passage 126 in the annular housing 166 is greater than the diameter 02 in the second region 160.

The ratio of the diameter 04 to the diameter 03 is less than the expansion ratio of the annular assembly 18, for example it lies in the range 1.05 to 1.50.

The bottom portion 168 of the sleeve presents an inside diameter 02 that is substantially equal to the inside diameter of the second region 160 and substantially equal to the inside diameter of the adjacent region of the bottom tube 152.

Such a sleeve 154 is thus shaped to receive the annular sealing assembly 18 of a mandrel 10 of the invention. As shown by FIG. 6, the bearing surface 39 is pressed against the outer wall of the housing 166 and he top surface SOB comes into abutment against the annular portion 162, thereby anchoring the mandrel 10 in an upward direction. The sealing as achieved in this way follows a periphery of the assembly 18 around the axis xX' in the outer wall of a housing 166 that is set back from the wall 14 of the borehole 12, as opposed to against a portion that projects relative to the wall 14 of the borehole 12. In a variant, the projecting portion 164 is omitted.

Since the outer wall of the housing 166 is set back in the wall 14, the risk of the outer wall of the housing being damaged by objects flowing along the passage 156 is limited. Thus, the axial scratches caused by successive cables being passed along wells that are inclined ("wire tracking") does not occur in the outer wall of the housing 166.

The annular assembly 18 then forms means that simultaneously anchor and seal the mandrel 10 in the borehole 12.

More generally, it is possible to use a mandrel comprising a body presenting a longitudinal axis, and:
  at least one radially-expandable annular assembly attached to the body, the annular assembly presenting a peripheral surface for pressing against a borehole and a peripheral surface for pressing against the body; and
  means for radially expanding the annular assembly.

The mandrel includes an annular sealing assembly, e.g. not having blocks 40, 42 and presenting an expansion ratio similar to that of the annular assembly 18 of the invention, that is disposed in a leaktight manner against the outer wall of the housing 166.

In another variant, each outer gasket 54 is made on the basis of a material that is deformable in a permanent manner, such as lead, for example.

The annular assembly 10 is displaced from its contracted configuration to its expanded configuration at a determined point along the borehole 12 in order to take a molding of the wall 14 of the borehole 12 at said point by plastic deformation of the surface 39 constituted by the blocks 40, 42. It is then possible to detect surface irregularities in the wall 14, in particular axial grooves formed during the passage of successive cables in an inclined well ("wire tracking").

Thereafter, the annular assembly 18 is placed in its contracted configuration so as to be raised to the surface. A molding of the wall 14 of the borehole 12 at a predetermined point is thus obtained, thus making it possible to evaluate the surface state of said wall. Under such circumstances, the mandrel need not have any locking means 22.

By means of the invention as described above, it is possible to obtain a mandrel that presents an annular sealing and/or anchoring assembly 18 made up of a plurality of mutually-engageable blocks, the assembly 18 being capable of being subjected to a strong radial expansion that is reversible.

For this purpose, the annular assembly 18 is kept in a contracted configuration for insertion of the mandrel 10 into the borehole 12 and for its removal therefrom. The annular assembly 18 is deployed radially by mutually engaging the blocks 40, 42, in particular to establish sealing between the mandrel 10 and the borehole 12, or to scrape the inside wall 14 of the borehole 12, or to take a molding thereof.

In a variant, the plug 74 is replaced by a safety valve under electromagnetic control, as described in French patent application No. 05/08880, or by a quick-closing test valve as described in FR-A-2 842 881, or any other downhole tool that requires leaktight anchoring in the well.

In another variant, the plug 74 is replaced by a tube that is merely open at both ends, the mandrel 10 then forming a permanent packer element. Under such circumstances, the mandrel may carry an actuator device. In addition, the mandrel may be lowered using a string of 20 rods.

In another variant, the mandrel has at least two annular assemblies 18 that are axially spaced apart and that can be disposed in axial opposition on opposite sides of an anchor system comprising dogs.

Figure 8:
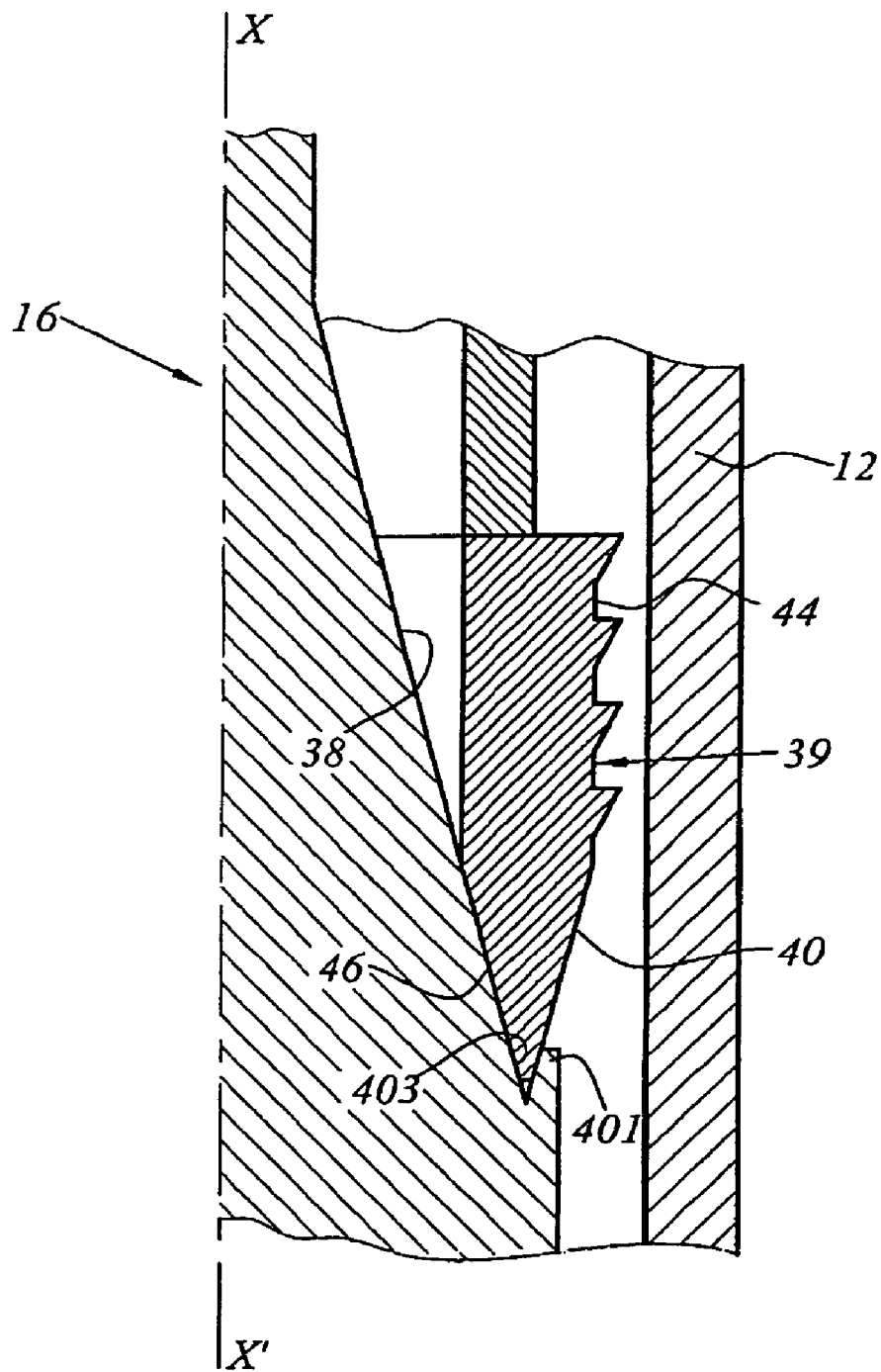
FIG. 8 is a view analogous to FIG. 4A showing a variant mandrel of the invention.

In another variant shown in FIG. 8, the outer peripheral surface 39 of the annular assembly 18 presents a cross-section of a sawtooth or smooth shape, and the anchor dogs 24 are replaced by smooth centering shoes.

The mandrel 10 is then displaced longitudinally in the borehole 12 while the annular assembly 18 is in the expanded configuration, in order to scrape the inside wall 14, or to form a piston that can be displaced in the borehole 12.

Under such circumstances, the bearing surface 38 defines externally around the axis X-X' a top abutment 401 for blocking the top blocks 40 in position. This abutment 401 presents a plane shape that is orthogonal to the axis X-X' or an annular conical shape that converges towards the bottom end of the mandrel 10. Under such circumstances, the conical abutment 401 co-operates with the region of the bearing surface 38 that converges towards the bottom end of the mandrel 10 to define an annular housing 403 for receiving the blocks 40.

The top blocks 40 are then brought into contact with the top abutment prior to breaking the first pin 96, thus making it possible to obtain a determined expanded diameter for the annular assembly.

The invention claimed is:

1. A mandrel for insertion in a borehole in which a fluid circulates, the mandrel comprising:
   a body having a longitudinal axis; and
   a radially-expandable annular assembly attached to the body, the radially-expandable annular assembly including:
      a first peripheral surface for pressing against the borehole;
      a second peripheral surface for pressing against the body; and
      a plurality of radial expansion blocks, each radial expansion block of the plurality of radial expansion blocks having a first bearing face defining a portion of the first peripheral surface, a second bearing face defining a portion of the second peripheral surface, and two side surfaces disposed on opposite sides of the radial expansion block, the plurality of radial expansion blocks being disposed about the longitudinal axis of the body so that each side surface of each radial expansion block faces a side surface of an adjacent radial expansion block,
   wherein radial expansion blocks of the plurality of radial expansion blocks are displaceable relative to one another, and
   wherein the radially-expandable annular assembly has a radially-expanded, engaged configuration in which each side surface of each radial expansion block is pressed against the side surface of the adjacent block, and the radially-expandable annular assembly has a radially-contracted configuration having a radial size smaller than a radial size of the radially-expandable annular assembly in the radially-expanded, engaged configuration,
   wherein the body includes a block-bearing surface,
   wherein the first bearing face of each radial expansion block is substantially cylindrical about the longitudinal axis and the second bearing face of each radial expansion block is inclined relative to the longitudinal axis,
   wherein, for each radial expansion block, the first bearing face and the second bearing face are interconnected by the two side surfaces,
   wherein at least one radial expansion block of the plurality of radial expansion blocks is mounted so as to be able to slide longitudinally over the block-bearing surface between a position in which the radially-expandable annular assembly is in the radially-contracted configuration and a position in which the radially-expandable annular assembly is in the radially-expanded, engaged configuration, and
   wherein the block-bearing surface is inclined relative to the longitudinal axis.

2. The mandrel according to claim 1,
   wherein the radial expansion blocks are displaceable relative to one another by sliding, each side surface of each radial expansion block being configured to slide along the side surface of the adjacent radial expansion block, and
   wherein the side surfaces are shaped to be able to cause the annular assembly to expand radially by a wedging effect.

3. The mandrel according to claim 1,
   wherein at least a first radial expansion block of the plurality of radial expansion blocks includes a first side surface and a second side surface, the first side surface converging toward the second side surface in a direction along the longitudinal axis, and
   wherein at least a second radial expansion block of the plurality of radial expansion blocks adjacent to the first radial expansion block includes a first side surface and a second side surface, the first side surface diverging away from the second side surface in the direction along the longitudinal axis.

4. The mandrel according to claim 3,
   wherein each radial expansion block is substantially trapezoidal in shape,
   wherein a height direction of each trapezoidal shape is substantially parallel to the longitudinal axis, and
   wherein the plurality of radial expansion blocks is further disposed about the longitudinal axis of the body so that respective radial expansion blocks alternate in orientation with respect to the longitudinal axis.

5. A mandrel according to claim 1, wherein the block-bearing surface defines a top abutment for blocking at least one radial expansion block of the plurality of radial expansion blocks in position.

6. The mandrel according to claim 1,
   wherein the annular assembly has pressing means for pressing at least one radial expansion block of the plurality of radial expansion blocks against the block-bearing surface.

7. The mandrel according to claim 1,
   wherein each radial expansion block comprises:
      a reinforcement including a top edge and/or a bottom edge, the reinforcement defining an outer annular housing that is open at outer side surfaces; and
      an outer sealing gasket placed in the outer annular housing, and
   wherein in the radially-expanded, engaged configuration, outer annular housings of adjacent radial expansion blocks communicate with one another through side surfaces around at least one periphery of the longitudinal axis.

8. The mandrel according to claim 7,
wherein the reinforcement further defines an inner annular housing open at inner side surfaces,
wherein each radial expansion block has an inner sealing gasket placed in the inner annular housing, and
wherein in the radially-expanded, engaged configuration, inner annular housings of adjacent radial expansion blocks communicate with one another through side surfaces around at least one periphery of the longitudinal axis.

9. The mandrel according to claim 1, further comprising one or more anchor members for anchoring to the borehole, the one or more anchor members being radially deployable relative to the body and disposed under the radially-expandable annular assembly.

10. A well for working a fluid, the well comprising:
a borehole; and
the mandrel according to claim 1 disposed in the borehole.

11. The well according to claim 10,
wherein the borehole comprises:
a first tube;
a second tube; and
a sleeve interconnecting the first and second tubes, the sleeve having an annular groove for receiving the radially-expandable annular assembly, and having a diameter greater than a mean diameter of a central passage,
wherein the first tube, the second tube, and the sleeve define a fluid flow passage, and
wherein the radially-expandable annular assembly in its radially-expanded, engaged position is pressed against an outer wall of the annular groove.

12. The well according to claim 11, wherein the sleeve comprises a projection for blocking the annular assembly in position, the projection projecting inwardly into the central passage relative to the first tube and to the second tube, a top edge of the radially-expandable annular assembly being jammed axially against the projection.

13. The mandrel according to claim 1, wherein the block-bearing surface is conical in shape.

14. The mandrel according to claim 1,
wherein the first peripheral surface is continuous over at least one circumference thereof in the radially-expanded, engaged configuration of the radially-expandable annular assembly, and
wherein the second peripheral surface is continuous over at least one circumference thereof and is pressed against the block-bearing surface to provide sealing between the radially-expandable annular assembly and the body in the radially-expanded, engaged configuration of the radially-expandable annular assembly.

15. A mandrel for insertion in a borehole in which a fluid circulates, the mandrel comprising:
a body having a longitudinal axis;
a radially-expandable annular assembly attached to the body, the radially-expandable annular assembly including:
a first peripheral surface for pressing against the borehole;
a second peripheral surface for pressing against the body; and
a plurality of radial expansion blocks each radial expansion block of the plurality of radial expansion blocks having a first bearing face defining a portion of the first peripheral surface, a second bearing face defining a portion of the second peripheral surface, and two side surfaces disposed on opposite sides of the radial expansion block, the plurality of radial expansion blocks being disposed about the longitudinal axis of the body so that each side surface of each radial expansion block faces a side surface of an adjacent radial expansion block,
wherein radial expansion blocks of the plurality of radial expansion blocks are displaceable relative to one another,
wherein the radially-expandable annular assembly has a radially-expanded, engaged configuration in which each side surface of each radial expansion block is pressed against the side surface of the adjacent block, and the radially-expandable annular assembly has a radially-contracted configuration having a radial size smaller than a radial size of the radially-expandable annular assembly in the radially-expanded engaged configuration; and
an expansion means for radially expanding the radially-expandable annular assembly,
wherein the expansion means includes a drive member releasably secured to at least one first block of the plurality of radial expansion blocks and secured to at least one second block of the plurality of radial expansion blocks, the drive member being movable longitudinally relative to the body and having:
a rest position in which the at least one first block and the at least one second block are secured to the drive member, the radially-expandable annular assembly occupying its radially-contracted configuration;
an intermediate position in which the at least one first block is free relative to the drive member and substantially stationary relative to the body; and
an active position for engagement of the at least one first block and the at least one second block, in which the radially-expandable annular assembly occupies its radially-expanded, engaged configuration.

16. The mandrel according to claim 15, further comprising:
means for pressing the drive member from its active position towards its intermediate position; and
releasable means for keeping the drive member in its active position.

* * * * *